(12) United States Patent
Fan et al.

(10) Patent No.: US 7,833,391 B2
(45) Date of Patent: Nov. 16, 2010

(54) SOLAR HYDROGEN CHARGER

(75) Inventors: Qinbai Fan, Chicago, IL (US); William E. Liss, Libertyville, IL (US)

(73) Assignee: Gas Technology Institute, Des Plaines, IL (US)

( * ) Notice: Subject to any disclaimer, the term of this patent is extended or adjusted under 35 U.S.C. 154(b) by 699 days.

(21) Appl. No.: 11/881,198

(22) Filed: Jul. 26, 2007

(65) Prior Publication Data

US 2009/0026070 A1    Jan. 29, 2009

(51) Int. Cl.
 C25B 9/08    (2006.01)
 C25B 9/10    (2006.01)

(52) U.S. Cl. .................. 204/263; 204/252; 204/266; 429/111; 429/188; 429/194; 429/198; 429/203; 136/256; 136/244; 136/252; 136/291; 136/249; 136/258

(58) Field of Classification Search .............. 204/252, 204/263, 266, 291; 429/111, 188, 194, 198, 429/199, 203; 136/256, 244, 252, 291, 249, 136/258
See application file for complete search history.

(56) References Cited

U.S. PATENT DOCUMENTS

| | | | | |
|---|---|---|---|---|
| 4,379,740 | A | * | 4/1983 | Nazzal et al. ............... 205/340 |
| 4,593,534 | A | | 6/1986 | Bloomfield |
| 4,654,468 | A | * | 3/1987 | Nath et al. ................... 136/256 |
| 4,927,721 | A | * | 5/1990 | Gratzel et al. ............... 429/111 |
| 5,728,487 | A | * | 3/1998 | Gratzel et al. ............... 429/111 |
| 5,900,031 | A | | 5/1999 | Bloomfield |
| 6,068,673 | A | | 5/2000 | Bloomfield |
| 6,994,929 | B2 | | 2/2006 | Barbir et al. |
| 7,241,950 | B2 | * | 7/2007 | Fan et al. ..................... 136/256 |
| 2002/0090868 | A1 | * | 7/2002 | Schmitman .................. 440/113 |
| 2006/0065302 | A1 | * | 3/2006 | Gibson et al. ............... 136/291 |

OTHER PUBLICATIONS

Park, J.H., et al., "Photoelectrochemical Tandem Cell with Bipolar Dye-Sensitized Electrodes for Vectorial Electron Transfer for Water", *Electrochemical and Solid-State Letters*, 9 (2) E5-E8 (2006).
Khan, S.U.M. et al., "Efficient Photochemical Splitting by a Chemically Modified n-$TiO_2$", *Science*, vol. 297, Sep. 27, 2002, pp. 2243-2245.

\* cited by examiner

*Primary Examiner*—Bruce F Bell
(74) *Attorney, Agent, or Firm*—Mark E. Fejer

(57) ABSTRACT

An apparatus for splitting water to produce hydrogen having at least one photoelectrochemical cell. The photoelectrochemical cell includes at least one water permeable photoelectrode having a light sensitive, nano-crystalline catalytic material layer, a polymer electrolyte membrane, a metallic substrate disposed between the light sensitive nano-crystalline catalytic material layer and the polymer electrolyte membrane adjacent to the polymer electrolyte membrane layer, and at least one photovoltaic device connected in series to the light sensitive nano-crystalline material layer and disposed between the light sensitive nano-crystalline catalytic material layer and the metallic substrate layer.

17 Claims, 3 Drawing Sheets

SOLAR HYDROGEN CHARGER

BACKGROUND OF THE INVENTION

1. Field of the Invention

This invention relates to a device for producing hydrogen for portable power applications. This invention further relates to a solar-powered device for producing hydrogen for portable power applications. This invention further relates to direct photoelectrolysis of water to generate hydrogen directly with sunlight employing a combination of advances in fuel cell technology, photovoltaic technology, photoelectrochemistry, and thin film technology. Finally, this invention relates to a photoelectrode employing a nano-crystalline catalyst material for use in the photoelectrolysis of water to generate hydrogen.

2. Description of Related Art

Hydrogen is an important future energy carrier and energy storage medium. Efficient, low-cost methods of making hydrogen will be important elements of a future hydrogen economy. Renewable electricity integration for hydrogen production is very important for reducing greenhouse gases and oil dependence of the U.S. A renewable hydrogen production device must be highly efficient, must have a long lifetime, and must be low in cost. Solar energy represents the best renewable energy source for such hydrogen production devices. Given the existence of an abundant supply of solar energy, solar photovoltaic, photoelectrochemical, or photocatalytic hydrogen generation can become viable technologies. However, to make this a reality, it is necessary to reduce costs, increase efficiency, and improve service life.

For present-day solar photovoltaic cell-driven electrolysis, the overall efficiency is the product of the efficiency of the solar cell and the efficiency of the electrolyzer. Solar cell efficiencies have been reported from 6% to as high as 32% depending upon the materials used. Conventional electrolyzer efficiency is approximately 75%. Thus, solar cell-driven electrolysis efficiency can be in the range of about 4.5% to about 24%; however, in practice, only values at the low end of this range are encountered. These low efficiencies are due in part to efficiency losses from sunlight absorption by a liquid electrolyte layer, impediments to the departure of product gases from the photoelectrodes due to electrolyte surface tension, and high overpotential of the photoelectrodes. In addition, system life is limited by photocorrosion and electrochemical corrosion of the electrode. Finally, in addition to all of the mechanical and operational issues, the costs of these devices are too high for wide use.

The current design of photoelectrodes is an additional hindrance to the development of improved photoelectrochemical systems because the semiconductors employed therein are fabricated on conductive substrates. With this type of design, there is no way to reduce the thickness of the electrolyte layer and eliminate the surface tension that acts as an inhibitor to the release of product gases because the reactant water and electrolyte must be transported to the front of the electrode.

Numerous efforts have been made to enhance the efficiency and stability of photoelectrochemical cells. The general approach has been to coat a layer of protective materials, which may be organic substances, active metal ions, noble metals, light sensitive dyes and more stable semiconductors, such as metal oxides, onto the photoelectrode surface. Recent developments include a thin film dye to sensitize the semiconductor electrodes in photoelectrochemical cells. Although the use of light sensitive dyes on the semiconductor electrode surface has improved the light absorption efficiency thereof, it is still necessary that the mass transport rate be increased and that the electrolyte thickness be reduced.

A 1 kw proton exchange membrane fuel cell stack (PEMFC) at 12 V requires about 84 A current. If the PEMFC is utilized 8 hours per day, power on the order of 8 kWhr/day is required. For power of this magnitude, assuming that hydrogen consumption in the fuel cell stack is 100%, the amount of hydrogen required to meet this demand is about 7.6 ml $H_2$/A-min, i.e. 456 ml $H_2$/A-hr. Thus, for a 1 kW fuel cell stack at 12 V, I=84, 666.7 A-hr/day, about 304.1 liters (666.5 A-hr/day×0.456 liters $H_2$/A-hr) of hydrogen at room temperature and ambient pressure is required. This amount of hydrogen is equivalent to about 13.57 moles or 27 grams $H_2$. However, in reality, hydrogen utilization by the fuel cell is only about 90%. Thus, 15 moles or 30 grams or 338 liters of $H_2$ at room temperature and ambient pressure are required. For a hydrogen storage tank having a volume of 17.1 liters, hydrogen pressurized to 19.8 atmospheres is required.

Electrochemical proton exchange membrane hydrogen concentrators/compressors are known in the art (e.g. Giner, Inc.) and generally employ two reaction steps:

Anode: $H_2(dilute)=2H^++2e$

Cathode: $2H^++2e=H_2$

In such devices, a hydrogen-containing gas stream at ambient pressure is fed to the anode compartment of the cell to produce protons by means of external electricity. The protons pass through the proton exchange membrane and generate hydrogen gas. With bias voltage, the desired elevated hydrogen pressure is generated. The current density, J, at any point in the electrochemical hydrogen compressor is given as follows:

$$J=V/\rho-b/\rho \ln(P_0/P_1)$$

where V is the uniform cell potential drop across the cell, $\rho$ is cell resistivity in Ohms·cm$^2$, b is RT/2F, $P_0$ is the outlet hydrogen pressure, and $P_1$ is the dilute hydrogen pressure. If hydrogen is fed to the anode at a pressure of 2 atm$_a$, $$E=29.5T/298 \log(P/P_{atm})mV$$

At 80° C. and 200 atm$_a$ pressure differential, E=70 mV. In reality, the compressor has an internal polarization resistance (iR drop), as a result of which the overall voltage thermodynamically is much higher than 70 mV. In practice, the compressor, with a cell operating in a liquid-water-flooded cathode configuration produces 6.90 MPa hydrogen pressure from 207 kPa with an active area at 214 cm$^2$, a cell voltage of 320 mV at 40° C., and a current density of about 2000 mA/cm$^2$. As previously indicated, to meet the requirements of a 1 kW PEMFC stack for 8 hours, 30 grams of hydrogen are required. Stored in a 17.1 liter tank, the pressure is 19.8 atm. The current density will be about 1493 mA/cm$^2$, i.e. a power density of 0.48 W/cm$^2$.

The amount of power needed to produce 30 grams of hydrogen is defined by $$Q=nF$$

where Q is coulombs, n is moles of hydrogen, and F is the Faraday constant. Accordingly, $$Q=2\times15 \text{ moles}\times96500 \text{ } C/\text{mole}=2.88\times10^6 \text{ } C$$

To produce 30 grams of hydrogen, the stack is operated for 6 hours per day and the current of the electrolyzer is $$I=Q/t=2.88\times10^6 \text{ } C/(5 \text{ hours}\times3600 \text{ s/hours})=160 \text{ } A$$

If the electrolyzer is operated at 1.6 V, the power of the electrolyzer will be at least 1.6 V×160 A=256 W. However, a commercial electrolyzer has an efficiency of 75%. Thus, the actual electrolyzer power must be 366 W.

A conventional solar panel has a power density of about 15 W/0.22 m$^2$ or 68 W/m$^2$. To produce 1 kW PEMFC operation for 8 hours requires a solar panel having a size of about 5.4 m$^2$. The conversion of solar energy to hydrogen has a relatively low efficiency of about 4.9%.

Additional challenges associated with photoelectrochemical water splitting include materials efficiency, materials durability, bulk material synthesis, device configuration, and system design and evaluation. In the case of materials efficiency, materials with smaller bandgaps utilize the solar spectrum more efficiently, but are less energetically favorable for hydrogen production because of the mismatch with either the hydrogen or oxygen redox potentials. Thus, there is a need for materials with appropriate bandgap for hydrogen production. In the case of materials durability, the high-efficiency materials currently available corrode quickly during operation, and the most durable materials are very inefficient for hydrogen production. Thus, there also is a need for durable materials with the appropriate characteristics for photoelectrochemical hydrogen production.

Based upon a screening of semiconductor materials used in conventional photoelectrochemical conversion processes, the narrow bandgap materials, such as II-VI series (CdS, CdSe, CdTe), III-V (InP), CIS (CuInSe$_2$), all have broad sunlight absorption spectra, but the stability of these materials is low. Metal semiconductors, by comparison, such as WO$_3$ and TiO$_2$, have large bandgaps and are highly stable, but the efficiencies resulting from the use of these materials are low.

Many attempts have been made to improve the metal oxide photo conversion efficiency. Recent reports have indicated that TiO$_2$ and WO$_3$ are very attractive for photo splitting of water for hydrogen production. Park, J. H. et al., *Electrochemical and Solid-State Letters*, 9(2) E5-E8, 2006 teaches an assembled photoelectrochemical tandem cell with bipolar dye-sensitized electrodes for water splitting for which a 2.5% solar-to-hydrogen efficiency was obtained with 0.2 V positive bias. Khan, S. U. M. et al., *Science*, Vol. 297, 2243-5 (2002) discloses a maximum photo-conversion efficiency of 8.35% using a chemically modified n-TiO$_2$ at 0.3 V positive bias. The chemically modified n-TiO$_2$ was synthesized by a direct flame pyrolysis of a Ti metal sheet. As is apparent from the teachings of these two references, a direct method for producing nano TiO$_2$ shows better photo conversion efficiency under similar bias conditions.

SUMMARY OF THE INVENTION

To address the issues set forth herein above, the invention disclosed and claimed herein is an apparatus for hydrogen generation and storage comprising a photoelectrochemical direct hydrogen generator having a water inlet connectable with a water supply and having a hydrogen gas outlet, an electrochemical compressor having a hydrogen gas inlet in fluid communication with the hydrogen gas outlet and having a compressed hydrogen gas outlet, and a hydrogen gas storage tank having a compressed hydrogen gas inlet in fluid communication with the compressed hydrogen gas outlet. In accordance with one particularly preferred embodiment, the photoelectrochemical direct hydrogen generator comprises at least one photoelectrochemical cell comprising a water permeable photoelectrode. The water permeable photoelectrode comprises a light sensitive, nano-crystalline catalytic material layer, a polymer electrolyte membrane layer, a metallic substrate layer disposed between the light sensitive, nanocrystalline catalytic material and the polymer electrolyte directly adjacent to the polymer electrolyte membrane layer, and at least one photovoltaic device connected in series to the light sensitive, nano-crystalline catalytic material layer and disposed between the light sensitive, nano-crystalline catalytic material layer and the metallic substrate layer. Each of the light sensitive, nano-crystalline catalytic material layer, the polymer electrolyte membrane layer, the metallic substrate layer and the at least one photovoltaic device is water permeable. Water from an electrolyte employed in the water-splitting apparatus of this invention permeates through the photoelectrode from the polymer electrolyte membrane layer to the light sensitive, nano-crystalline catalytic material layer at the surface, forming a three-phase zone, i.e., semi-conductor with electrochemical catalyst, water and product gases (hydrogen and oxygen). This helps to avoid corrosion of the important semiconductor photoelectrodes while also permitting maximum direct solar irradiance. The hydrogen thus generated is then removed from the housing for use or further processing as necessary. A suitable water permeable photoelectrode is disclosed in U.S. Pat. No. 7,241,950 B2, which patent is incorporated by reference herein in its entirety.

At least one, and preferably two or more, such photoelectrodes are disposed in the housing having at least one light transmissive wall. The photoelectrodes are arranged such that the light sensitive, nano-crystalline catalytic material layer is oriented in the direction of, and disposed at a distance from, the at least one light transmissive wall. The water-based electrolyte is disposed on the side of the photoelectrode on which is disposed the polymer electrolyte membrane layer and is precluded from coming between the light sensitive, nano-crystalline catalytic material layer and the at least one light transmissive wall. In this manner, sunlight striking the at least one light transmissive wall passes through the wall and directly strikes the light sensitive, nano-crystalline catalytic material layer of the photoelectrode without passing through an electrolyte layer. This reduces irradiance losses due to absorption or reflective scatter of sunlight striking or passing through an electrolyte layer as occurs in conventional systems.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

The system of this invention comprises three basic components—a solar hydrogen generator, an electrochemical hydrogen compressor, and a hydrogen storage tank. The hydrogen generator electrodes are made of solar panels and the hydrogen compressor is powered by solar cells.

Figure 1:
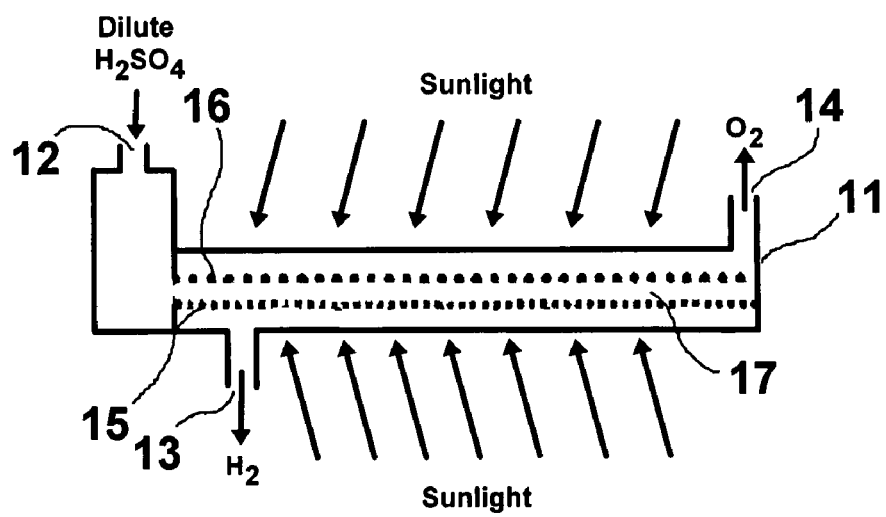
FIG. 1 is a schematic diagram of a photoelectrochemical direct water splitting device for hydrogen and oxygen production in accordance with one embodiment of this invention.

FIG. 1 is a schematic diagram of a photoelectrochemical direct water splitting device in accordance with one embodiment of this invention. The device comprises a housing 11 with transparent walls having a water intake 12, a hydrogen gas outlet 13 and an oxygen outlet 14. Disposed within the housing is a pair of photoelectrodes, a photoanode 15 and a photocathode 16, and an electrolyte 17 in the form of a dilute $H_2SO_4$ water solution disposed substantially only between the photoanode and the photocathode.

The photoanode of this invention comprises a nano-crystalline, porous $TiO_2$ catalyst disposed on a metal substrate. Particle sizes for the nano-crystals comprising the catalyst are in the range of about 50 nm to about 200 nm. In accordance with one embodiment of this invention, the metal substrate is a Ti metal foil. In accordance with a particularly preferred embodiment of this invention, the metal substrate is a titanium gauze.

Example

Figure 2:
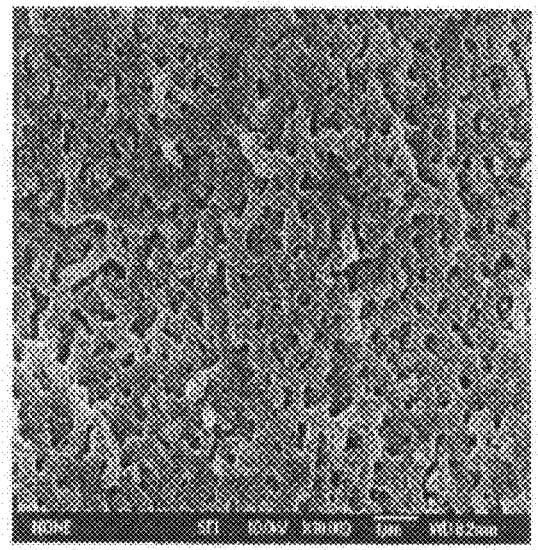
FIG. 2 is an SEM image of a nano-crystalline, porous TiO$_2$ catalyst growing electrochemically on a Ti metal foil.

A multi-layer nano-crystalline, porous $TiO_2$ film was obtained in an electrochemical cell having a Ti electrode as the working electrode, a graphite rod as the auxiliary electrode, and a 1.0 M $H_2SO_4$ solution as the electrolyte. The anode oxidation potentials were controlled at 90V, 120V, and 150V for 5 minutes to obtain the desired thickness and porosity of the $TiO_2$ layered films as shown in FIG. 2.

Example

A titanium gauze (40 mesh from Alfa Aesar) was cleaned ultrasonically in distilled water, acetone, and distilled water again to remove any contaminants. The electrode was then etched in a 4 wt % concentration of HF and rinsed with distilled water. The Ti gauze electrode was used as the working electrode, a graphite rod was used as the auxiliary electrode, and a 1.0 M $H_2SO_4$ solution was used as the electrolyte with various metal salt solutions for doping metal having particle sizes in the range of about 3 nm to about 100 nm into the nano-crystalline $TiO_2$ structure. The anode potentials were controlled at 120V for one (1) minute to obtain the $TiO_2$ layered films interval and to −0.5V for 30 seconds for metal doping. Three cycles of oxidation and reduction processes were carried out to obtain the desired thickness and porosity. The high oxidation potential to make $TiO_2$ produces a substantial amount of gas evolution, which generates pores in the catalyst layer. The negative voltage controls the amount of metal doping. The nano porous electrode was then sintered in air at 400° C. to form opal anatase $TiO_2$ structure. Thereafter, the Ti/$TiO_2$ gauze was dipped into a 5 wt % NAFION solution at least three times to fill the pores of the gauze. The coated electrode was dried at room temperature and cured in an oven at 120° C., resulting in a water permeable nano-crystalline, porous $TiO_2$ photoanode.

Figure 3:
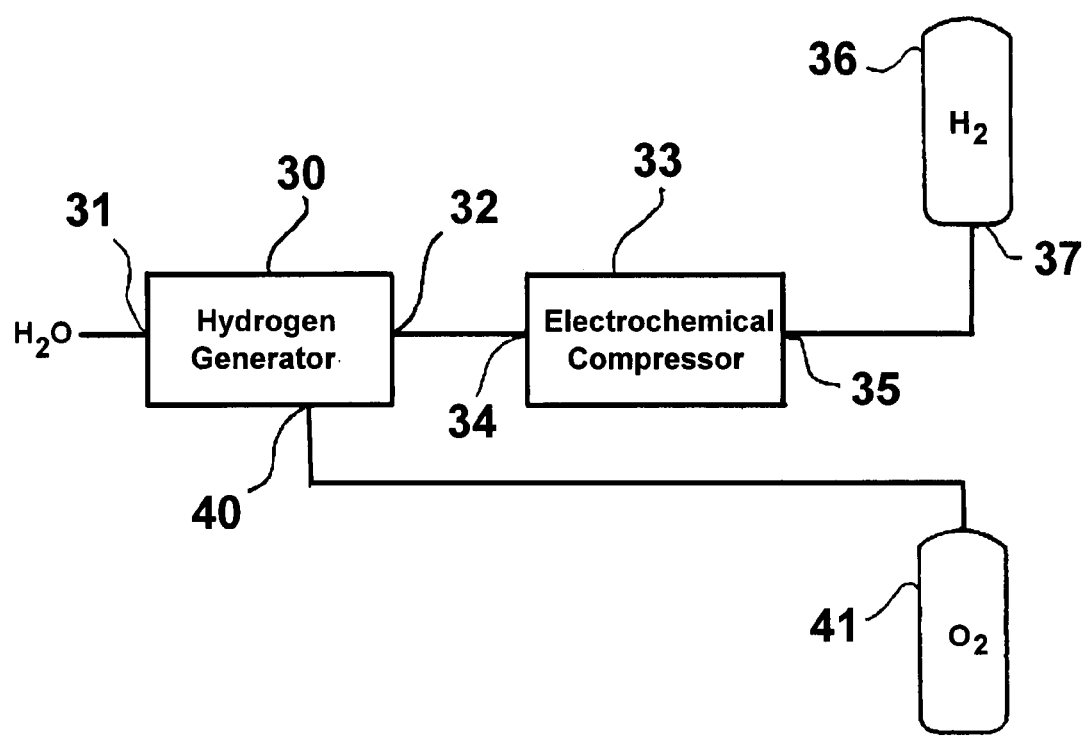
FIG. 3 is a schematic flow diagram of the solar hydrogen charger in accordance with one embodiment of this invention.

FIG. 3 shows a system for hydrogen generation, compression, and storage in accordance with one embodiment of this invention. As shown therein, the system comprises a photoelectrochemical direct hydrogen generator 30 having a water inlet 31 connectable with a water supply (not shown) and having a hydrogen gas outlet 32, an electrochemical compressor 33 having a hydrogen gas inlet 34 in fluid communication with the hydrogen gas outlet 32 and having a compressed hydrogen gas outlet 35, and a hydrogen gas storage tank 36 having a compressed hydrogen gas inlet 37 in fluid communication with the compressed hydrogen gas outlet 35. In accordance with one preferred embodiment of this invention, the photoelectrochemical direct hydrogen generator is provided with an oxygen gas outlet 40 through which oxygen gas generated in the water splitting process is expelled. In accordance with one embodiment of this invention, an oxygen storage tank 41 is provided for receiving the oxygen generated by the water splitting process.

The advantage of this electrode is that the Ti structure functions as the current collector and the $TiO_2$ nano structure is formed directly on the Ti metal so that a better contact is formed than there is obtained with a conventional coating method. The three-phase area for gas evolution, ionic transport and photon adsorption is, thus, well designed. In addition, the porous structure provided by the gauze increases the light path to the nano-crystalline particle surface and provides a good light scattering surface.

The counter electrode (cathode) in accordance with one embodiment of the photoelectrochemical cell of this invention is a p-Si semiconductor on a perforated stainless steel substrate for embodiments in which a mirror is used for light radiation. In accordance with another embodiment, the counter electrode is a carbon paper coated with Pt black, which provides a high surface area for hydrogen evolution. The carbon paper is water permeable. However, in this embodiment, no sunlight is used for the hydrogen evolution.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. An apparatus for hydrogen generation and storage comprising:
    a photoelectrochemical direct hydrogen generator having a water inlet connectable with a water supply, having a hydrogen gas outlet and comprising at least one photoelectrochemical cell comprising at least one water permeable photoelectrode comprising a light sensitive, nano-crystalline catalytic material layer, a polymer electrolyte membrane, a metallic substrate disposed between said light sensitive nano-crystalline catalytic material layer and said polymer electrolyte membrane adjacent to said polymer electrolyte membrane layer, and at least one photovoltaic device connected in series to said light sensitive nano-crystalline material layer and disposed between said light sensitive nano-crystalline catalytic material layer and said metallic substrate layer;
    an electrochemical compressor having a hydrogen gas inlet in fluid communication with said hydrogen gas outlet and having a compressed hydrogen gas outlet; and
    a hydrogen gas storage tank having a compressed hydrogen gas inlet in fluid communication with said compressed hydrogen gas outlet.

2. An apparatus in accordance with claim 1, wherein said electrochemical compressor is connected with at least one solar cell for powering said electrochemical compressor.

3. An apparatus in accordance with claim 1, wherein said at least one photoelectrochemical cell comprises a housing having at least one light transmissive wall, said at least one water permeable photoelectrode disposed within said housing, an additional electrode of opposite polarity from said at least one water permeable photoelectrode disposed within said housing at a distance from said at least one water permeable photoelectrode, and a water-based electrolyte disposed substantially only between said at least one water permeable photoelectrode and said additional electrode.

4. An apparatus in accordance with claim 3, wherein each of said light sensitive, nano-crystalline catalytic layer, said polymer electrolyte membrane layer, said metallic substrate layer, and said at least one photovoltaic device are water permeable.

5. An apparatus in accordance with claim 3, wherein said at least one water permeable photoelectrode is an n-$TiO_2$ photoanode.

6. An apparatus in accordance with claim 5, wherein said n-$TiO_2$ photoanode comprises nano-crystalline $TiO_2$ disposed on a metallic Ti substrate.

7. An apparatus in accordance with claim 6, wherein said metallic Ti substrate is selected from the group consisting of Ti metal foil and Ti gauze.

8. An apparatus in accordance with claim 3, wherein said additional electrode is a p-Si semiconductor disposed on a perforated stainless steel substrate.

9. An apparatus in accordance with claim 3, wherein said additional electrode comprises a carbon paper coated with Pt black.

10. An apparatus in accordance with claim 1, wherein said photoelectrochemical direct hydrogen generator has an oxygen gas outlet.

11. An apparatus in accordance with claim 10 further comprising an oxygen gas storage tank having an oxygen gas inlet in fluid communication with said oxygen gas outlet.

12. An apparatus for splitting water to produce hydrogen comprising:

at least one photoelectrochemical cell comprising at least one water permeable photoelectrode comprising a light sensitive, nano-crystalline catalytic material layer, a polymer electrolyte membrane, a metallic substrate disposed between said light sensitive nano-crystalline catalytic material layer and said polymer electrolyte membrane adjacent to said polymer electrolyte membrane layer, and at least one photovoltaic device connected in series to said light sensitive nano-crystalline material layer and disposed between said light sensitive nano-crystalline catalytic material layer and said metallic substrate layer.

13. An apparatus in accordance with claim 12, wherein said at least one photoelectrode is an n-$TiO_2$ photoanode.

14. An apparatus in accordance with claim 13, wherein said n-$TiO_2$ photoanode comprises nano-crystalline $TiO_2$ disposed on a metallic Ti substrate.

15. An apparatus in accordance with claim 14, wherein said metallic Ti substrate is selected from the group consisting of Ti metal foil and Ti gauze.

16. An apparatus in accordance with claim 15 further comprising a cathode electrode comprising a p-Si semiconductor disposed on a perforated stainless steel substrate.

17. An apparatus in accordance with claim 15 further comprising a cathode electrode comprising a carbon paper coated with Pt black.

* * * * *